C. G. GRABO.
Potato Digger.
No. 67,040. Patented July 23, 1867.
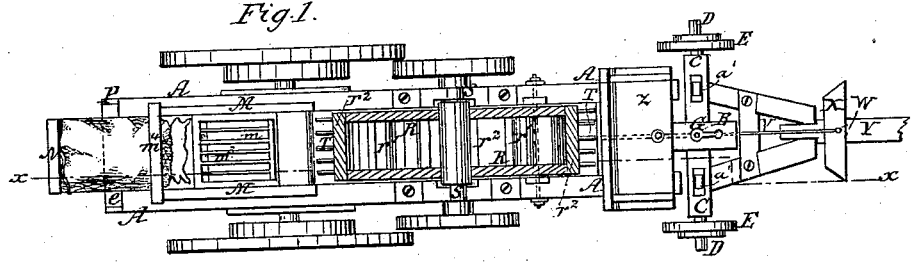
Witnesses.
Theo. Tusche.
Wm. Tuuru.
Inventor:
C. G. Grabo
Per Munn & Co.
Attys

United States Patent Office.

CHRISTIAN G. GRABO, OF DETROIT, MICHIGAN.

Letters Patent No. 67,040, dated July 23, 1867.

---

IMPROVEMENT IN POTATO-DIGGERS.

---

The Schedule referred to in these Letters Patent and making part of the same.

---

TO ALL WHOM IT MAY CONCERN:

Be it known that I, CHRISTIAN G. GRABO, of Detroit, in the county of Wayne, and State of Michigan, have invented a new and improved Machine for Digging and Gathering Potatoes; and I do hereby declare that the following is a full, clear, and exact description thereof, which will enable others skilled in the art to make and use the same, reference being had to the accompanying drawings, forming part of this specification, in which—

Figure 1 is a top view of my improved machine partly in section through the finger-wheel.

Figure 2 is a vertical longitudinal section of the same taken through the line $x\ x$, fig. 1.

Figure 3 is an under side view of the same.

Similar letters of reference indicate like parts.

My invention has for its object to furnish an improved machine by means of which potatoes may be dug and gathered thoroughly and cleanly; and it consists in the combination of the crank-screw with the supporting-bar and with the bolsters of the forward axle; in the combination of the ground-pusher or plough with the frame of the machine; in the combination of the shovel and catcher with the frame of the machine and with the finger-wheel; in the combination of the receiving and separating box furnished with upper and lower grates or sieves with the frame of the machine; and in the combination of the supporting-board with the frame of the machine and with the receiving and separating-box; the whole being constructed and arranged as hereinafter more fully described.

A is the frame of the machine, consisting of two longitudinal side bars $a^1$, the forward ends of which are connected together and secured in their proper relative positions by two cross-bars, $a^2$ and $a^3$, and the rear ends are connected by the bolt $a^4$, as shown in figs. 2 and 3. B is the supporting-bar, the rear end of which is securely bolted to the cross-bars $a^2$ and $a^3$ of the frame A and the forward end of which rests upon the upper bolster C of the fore wagon. D is the forward axle of the wagon, the wheels E of which are made small, so that the machine may be turned at right angles at the end of the ridge or row. F is a bolster fitting upon the upper side of the axle D, and which is secured in place by the stakes $d'$. The bolster F has a socket formed in the centre of its upper side for the reception of the end of the crank-screw G. The bolster C is fitted upon the upper side of the bolster F, is kept in place by the stakes $d'$, and has a vertical hole formed through its centre, in which a screw-thread is cut for the reception of the crank-screw G. The crank-screw G passes down through a hole in the end of the supporting-bar B, through the hole in the bolster C, and its lower end rests in the socket in the bolster F, so that by means of the crank-shaft G the height of the forward end of the frame A, and consequently the depth at which the machine runs in the ground, can be regulated at pleasure. H is the shovel and catcher, which is formed of a number of bars, $h^1$, set parallel with each other, and made in the shape shown in fig. 2. The bars $h^1$ are secured to each other by bolts $I^1\ I^2\ I^3$ passing through them, and they are kept at the proper distance from each other by rings, through which the said bolts pass, and which are placed between each of the said bars. J are bars, through the lower ends of which the ends of the bolts $I^2$ pass, and the upper ends of which are secured to the side timbers $a^1$ of the frame A. K are bars, through the lower ends of which the bolt $I^3$ passes, and the upper ends of which are secured to the side timbers $a^1$ of the frame A, just in the rear of the cross-bar $a^2$. $h^2$ are bars, of the same form as the bars $h^1$, which are attached to the frame A and to the bars J and K, as shown in fig. 2, to prevent the potatoes from falling off at the sides while passing up the catcher H. L is an inclined board attached to the frame A of the machine, down which the potatoes pass from catcher H to the receiving-bar M. $m^1$ is a grate or screen placed in the box M in such a position that it shall be a continuation of the inclined plane L, and through which the dirt and small potatoes fall into the lower part of the box M. The bottom $m^2$ of the box M is perforated, or is formed of a screen, the meshes of which are so small as to retain the small potatoes but allow the dirt to fall through it to the ground. Through the rear side of the lower part of the box M is formed a door hole closed by a slide, $m^3$, through which the small potatoes may be withdrawn. From the screen $m^1$ the larger potatoes pass into the bag, which is kept open by a metallic hoop or bag-holder, nearly rectangular in form, over which the mouth of the bag is folded, and which is supported by cleats attached to the sides of the rear part of the box M in a slightly inclined position, as shown in fig. 2. The rear side of the bag-holder is supported by resting against the side of the slide $m^4$, which forms the rear side of the box M, slides in grooves formed in the frame A for its reception, and the ends of which project out and form shoulders, which rest upon the frame A and prevent the said slide from slipping down too far. The lower part of the bag, while being filled, rests upon the supporting-board N, the forward end of which rests upon the bolt O, and is kept from slipping out of place by the hook $n'$ attached to its forward end, and which hooks upon the rear side of the lower part of the box M at the upper edge of the doorway through said side. The middle part of the board or platform N is supported by the strap P, the ends of which are bent up and hook over the upper edge of the rear end of the frame A. The board N is represented as being made in two parts, but I prefer to make it in a single piece. R is the finger-wheel, which consists of two disks attached to a shaft, S, revolving in bearings upon the frame A. The disks of the wheel R are connected and held in their proper relative positions by crossbars or bolts, $r^1$, as shown in figs. 1 and 2. The edges of the disks are notched at regular distances for the reception of the cross-bars $r^2$, to which the fingers T are attached. The cross-bar $r^2$ may be secured in place by rings or bands passing around the said disks over the ends of the said cross-bars, or in any other convenient and substantial manner. The curve of the wheel R and the curve of the upper parts of the bars $h^1$ should correspond with each other, and the fingers T should be of such a length as to allow space for the passage of the potatoes and such earth as may adhere to them up between the said bars $h^1$ and the circumference of the wheel R, and at the same time carry up all the potatoes that may enter upon the catcher H. U is a cross-bar firmly secured to the bars K, to the middle part of which is attached a strong draught-hook, $u'$, upon which hooks the rear end of the draught-chain V, the forward end of which passes through a notch in the forward axle D, and is secured to the bolt W that connects the double-tree X to the tongue Y. The bolt W passes through a slot in the said tongue Y, so that all the draught may come upon the draught-chain V. Z is the driver's seat, the only use of which, when the machine is working, is to carry the empty and partially-filled bags. A' is the ground-pusher or plough for removing the surface of the ground in front of the catcher H. This ground-pusher is a thick plank, the forward edge of which is cut into the form of a right angle, as shown in fig. 3, and which is connected to the frame A by the standards B', the upper ends of which are attached to said frame in such a position that the rear side of the said pusher may rest against the bars K. The forward edge or angle of the pusher should be faced or shod with a metallic strap, as shown in fig. 2.

In using the machine, it is drawn to the end of the row or ridge and adjusted by the crank-screw G, so as to run at the proper depth. An empty bag is then arranged upon the support N and the machine started. When the bag is filled the machine is stopped and the full bag removed and set at one side. The supporter N and upper screen $m^1$ are then removed, another bag arranged with its holder resting upon the bolt O, and the slide $m^3$ drawn out. This allows the small potatoes to flow out of the lower part of the box M. The partially filled bag is then placed upon the seat Z, the slide $m^3$, screen $m^1$, and support N replaced, and another bag arranged to receive the large potatoes, and the machine again started.

What I claim as new, and desire to secure by Letters Patent, is—

1. The shovel and catcher H, constructed as described, in combination with the finger-wheel R and with the frame A of the machine, substantially as herein shown and described and for the purpose set forth.

2. The combination of the receiving and separating-box M, furnished with an upper grate or screen, $m^1$, and lower screen $m^2$ with the frame of the machine, substantially as herein shown and described and for the purpose set forth.

3. The combination of the supporting-board N with the frame A of the machine and with the receiving and separating-box M, substantially as herein shown and described and for the purpose set forth.

CHRISTIAN G. GRABO.

Witnesses:
 FRIT. SEEBALDT,
 CHRISTIAN LANDAW.